United States Patent
Tomomatsu et al.

(10) Patent No.: US 8,810,822 B2
(45) Date of Patent: Aug. 19, 2014

(54) IMAGE READING DEVICE

(71) Applicant: Brother Kogyo Kabushiki Kaisha, Nagoya (JP)

(72) Inventors: Yoshitsugu Tomomatsu, Nagoya (JP); Naoki Tanjima, Nissin (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/799,202

(22) Filed: Mar. 13, 2013

(65) Prior Publication Data
US 2013/0194606 A1 Aug. 1, 2013

Related U.S. Application Data

(63) Continuation-in-part of application No. PCT/JP2012/057283, filed on Mar. 22, 2012.

(30) Foreign Application Priority Data

Mar. 30, 2011 (JP) ................................. 2011-076659

(51) Int. Cl.
*G06F 3/12* (2006.01)
(52) U.S. Cl.
USPC ....... 358/1.13; 358/1.15; 358/1.14; 358/1.16; 358/474; 358/448
(58) Field of Classification Search
CPC ............................. G06F 13/102; G06F 3/0644
USPC .................... 358/1.1–1.18, 448, 474
See application file for complete search history.

(56) References Cited

U.S. PATENT DOCUMENTS

| 6,691,187 B1 * | 2/2004 | Schwerin ........................ 710/62 |
| 6,947,171 B1 * | 9/2005 | Narusawa et al. ............. 358/1.6 |
| 7,237,046 B2 | 6/2007 | Paley et al. |
| 7,721,115 B2 | 5/2010 | Luttmann et al. |

(Continued)

FOREIGN PATENT DOCUMENTS

| JP | 2003-140868 | 5/2003 |
| JP | 2007-528036 | 10/2007 |

(Continued)

OTHER PUBLICATIONS

Japanese International Search Report for PCT/JP2012/057283.

(Continued)

*Primary Examiner* — Dennis Dicker
(74) *Attorney, Agent, or Firm* — McCarter & English, LLP

(57) ABSTRACT

An image reading device includes a reading portion and a communication portion. The reading portion reads an image. The communication portion performs communications with an external device by using a first class driver and a second class driver simultaneously. The communication portion includes a first transmission portion, a receiving portion, and a second transmission portion. The first transmission portion transmits to the external device, using the first class driver, data that are used for executing an application that enables the external device to issue a command to the image reading device. The receiving portion receives a command to read an image from the external device using the second class driver. The second transmission portion transmits to the external device, in a case where the receiving portion has received the command to read an image, using the second class driver, an image that has been read by the reading portion.

7 Claims, 11 Drawing Sheets

(56) References Cited

U.S. PATENT DOCUMENTS

| | | |
|---|---|---|
| 7,793,014 B2 | 9/2010 | Paley |
| 8,456,715 B2* | 6/2013 | Watanabe et al. ............. 358/474 |
| 8,477,358 B2* | 7/2013 | Sugimura et al. ............ 358/1.16 |
| 2003/0225971 A1* | 12/2003 | Oishi et al. .................... 711/115 |
| 2004/0098596 A1* | 5/2004 | Elteto et al. ................... 713/185 |
| 2005/0286091 A1* | 12/2005 | Harel et al. ................... 358/474 |
| 2007/0211310 A1* | 9/2007 | Kadota ......................... 358/474 |
| 2008/0239378 A1* | 10/2008 | Uno ............................. 358/1.15 |
| 2011/0038005 A1 | 2/2011 | Ochial et al. |
| 2012/0243018 A1* | 9/2012 | Shirota et al. ............... 358/1.13 |
| 2013/0050734 A1* | 2/2013 | Ito et al. ...................... 358/1.13 |

FOREIGN PATENT DOCUMENTS

| | | |
|---|---|---|
| JP | 2008-533561 | 8/2008 |
| JP | 2010-87662 | 4/2010 |
| JP | 2010-113702 | 5/2010 |

OTHER PUBLICATIONS

International Preliminary Report on Patentability issued in PCT/JP2012/057283 mailed on Oct. 17, 2013.

* cited by examiner

IMAGE READING DEVICE

CROSS-REFERENCE TO RELATED APPLICATION

This application is a continuation-in-part of International Application No. PCT/JP2012/057283, filed Mar. 22, 2012, which claims priority from Japanese Patent Application No. 2011-076659, filed on Mar. 30, 2011. The disclosure of the foregoing application is hereby incorporated by reference in its entirety.

BACKGROUND

The present disclosure relates to an image reading device that is connected to an external device such as a personal computer or the like and reads an image based on a command from the external device.

An image reading device is known in which a plurality of class drivers are installed. For example, a mass storage class driver and a scanner class driver are installed in the image reading device. The image reading device determines whether a scanner class driver that the image reading device can use is installed in a personal computer to which the image reading device is connected. Based on the result of the determination, the image reading device selects and uses one of class drivers. For example, in a case where a scanner class driver that the image reading device can use is installed in the personal computer, the image reading device selects and uses the scanner class driver. An image that the image reading device has read is transmitted to the personal computer by using the scanner class driver. In contrast, in a case where a scanner class driver that the image reading device can use is not installed in the personal computer, the image reading device selects and uses a mass storage class driver. The image that the image reading device has read is read directly by the personal computer.

With the image reading device that is described above, in a state in which the mass storage class driver is used, a capture application that is stored in the image reading device is also read by the personal computer in some cases. The executing of the capture application that the personal computer has read makes it possible for the image reading device to start reading an image.

SUMMARY

With the image reading device that is described above, in a case where a scanner class driver that the image reading device can use is not installed in the personal computer, the reading of the capture application and the image is performed by using only the mass storage class driver. In that case, there is a possibility that the volume of data that the mass storage class driver allows to be transmitted will be exceeded. In that sort of case, there is a possibility that the image reading device will be unable to perform the transmitting of the image smoothly.

Embodiments of the broad principles derived herein provide an image reading device that is able to perform image transmission smoothly using a plurality of class drivers.

Embodiments provide an image reading device configured to be connected to an external device in which standard class drivers have been installed and configured to read an image based on a command from the external device. The standard class drivers are a plurality of class drivers. The image reading device includes a reading portion and a communication portion. The reading portion reads an image. The communication portion performs communications with the external device by using a first class driver and a second class driver simultaneously. The first class driver is a class driver that is installed in the image reading device and that corresponds to one of the standard class drivers. The second class driver is a class driver that is installed in the image reading device and that corresponds to one of the standard class drivers. The second class driver is a different class driver from the first class driver. The communication portion includes a first transmission portion, a receiving portion, and a second transmission portion. The first transmission portion transmits to the external device, using the first class driver, data that are used for executing an application that enables the external device to issue a command to the image reading device. The receiving portion receives from the external device, in a case where a command to read an image has been input to the external device after the external device has executed the application based on the data that were transmitted by the first transmission portion, using the second class driver, the command to read an image. The second transmission portion transmits to the external device, in a case where the receiving portion has received the command to read an image, using the second class driver, an image that has been read by the reading portion.

BRIEF DESCRIPTION OF THE DRAWINGS

Embodiments will be described below in detail with reference to the accompanying drawings in which.

DETAILED DESCRIPTION

Hereinafter, an embodiment of the present disclosure will be explained with reference to the drawings. The drawings are used for explaining technological features that the present disclosure can utilize. Device configurations, flowcharts for various types of processing, and the like are merely explanatory examples and do not serve to restrict the present disclosure to the configurations, flowcharts, and the like that are shown.

Figure 1:
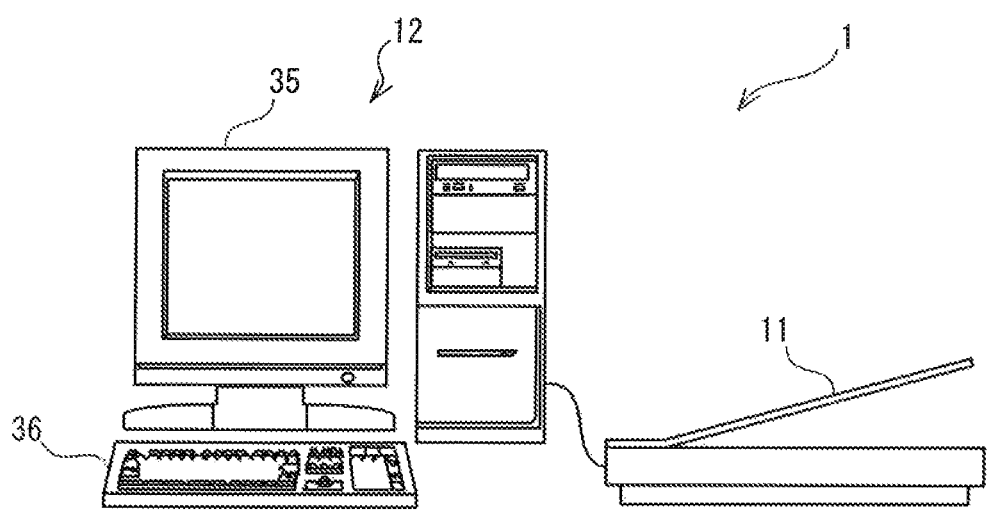
FIG. 1 is a schematic figure that shows an overview of a printing system.

A printing system 1 will be explained with reference to FIG. 1. The printing system 1 includes an image reading device 11 and a personal computer 12. The image reading device 11 is configured to be connected to the personal computer 12 by a USB cable. The image reading device 11 is a type of image scanner. A user can perform an input operation on the personal computer 12 through a keyboard 36 and a mouse 37 (refer to FIG. 2). The user can control the operation of the image reading device 11 by performing an input operation on the personal computer 12. The image reading device 11 reads an image based on a command from the personal computer 12. The image reading device 11 transmits the image that has read to the personal computer 12 through the USB cable. The personal computer 12 displays the image that has received from the image reading device 11 on a display 35. The user is thus able to check an image that has been read from a document.

Figure 2:
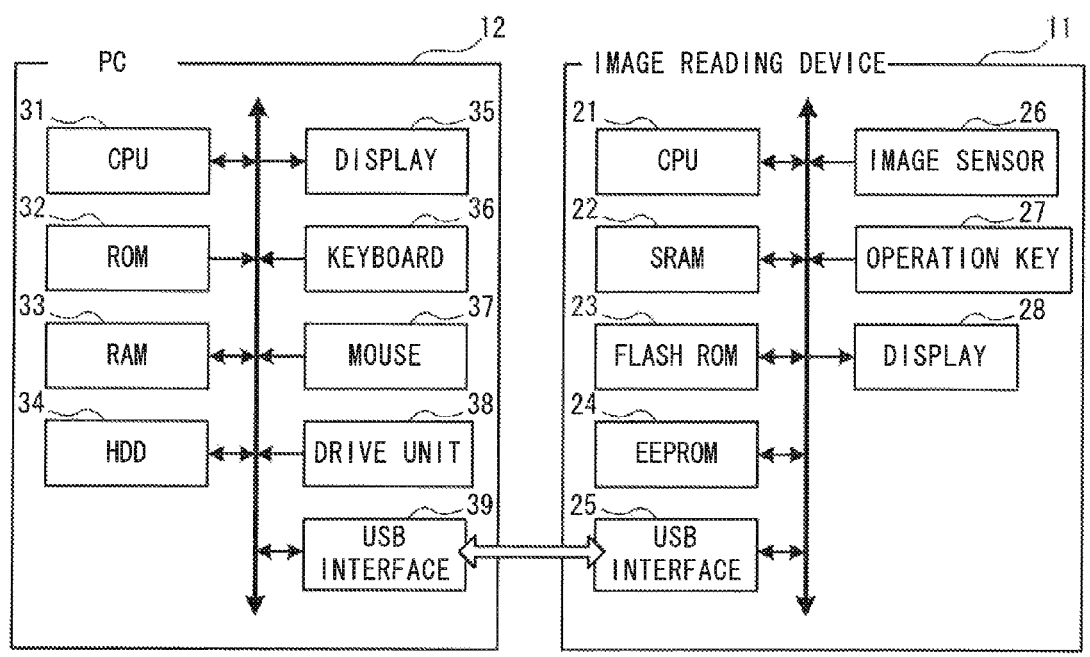
FIG. 2 is a block diagram that shows electrical configurations of an image reading device and a personal computer.

The electrical configuration of the image reading device 11 will be explained with reference to FIG. 2. The image reading device 11 includes a CPU 21 that controls over the entire image reading device 11. An SRAM 22, a flash ROM 23, an EEPROM 24, a USB interface 25, an image sensor 26, an operation key 27, and a display 28 are connected to the CPU 21.

A timer, a counter, and temporary data may be stored in the SRAM 22. An image that has been read by the image sensor 26 may also be stored temporarily in the SRAM 22. A control program for the CPU 21 may be stored in the flash ROM 23. An application that is used for allowing the personal computer 12 to issue a command to the image reading device 11 may be flash ROM 23. An executable file for the application that the personal computer 12 executes may also be stored in the flash ROM 23. The executable file includes data that are used for executing the application. In a case where the user causes the image reading device 11 to read the image by operating the personal computer 12, the personal computer 12 needs to execute the application to cause the image reading device 12 to read the image. This will be described in detail later. Parameters and reading conditions may be stored in the EEPROM 24. The parameters may include, for example, an optimum operating parameter for a case where the CPU 21 operates the image sensor 26, or a strength parameter for light (not shown in the drawings) that illuminates a document. The reading conditions may include, for example, a number of pixels, a monochrome or color setting, and a gray level setting for a case where an image is read. The USB interface 25 is a controller for controlling communication through the USB cable. The image sensor 26 is able to read an image. The image sensor 26 may be a CCD sensor or a CIS sensor for reading an image from a document that has been set on a platen.

The electrical configuration of the personal computer 12 will be explained. The personal computer 12 includes a CPU 31 that controls over the entire personal computer 12. A ROM 32, a RAM 33, a HDD 34, the display 35, the keyboard 36, the mouse 37, a drive unit 38, and a USB interface 39 are connected to the CPU 31. A boot program, a BIOS, and the like are stored in the ROM 32. A timer, a counter, and temporary data may be stored in the RAM 33. The executable file that has been received from the image reading device 11 for executing the application is also stored in the RAM 33. This will be described in detail later. A control program and an operating system for the CPU 31 may be stored in the HDD 34. The image that the image reading device 11 has read may also be stored in the HDD 34. The drive unit 38 is able to read information that is stored in a storage medium (not shown in the drawings). For example, when the control program is set up, the control program, which is stored in the storage medium, is read by the drive unit 38 and is stored in the HDD 34. The USB interface 39 is a controller for controlling communication through the USB cable.

Figure 3:
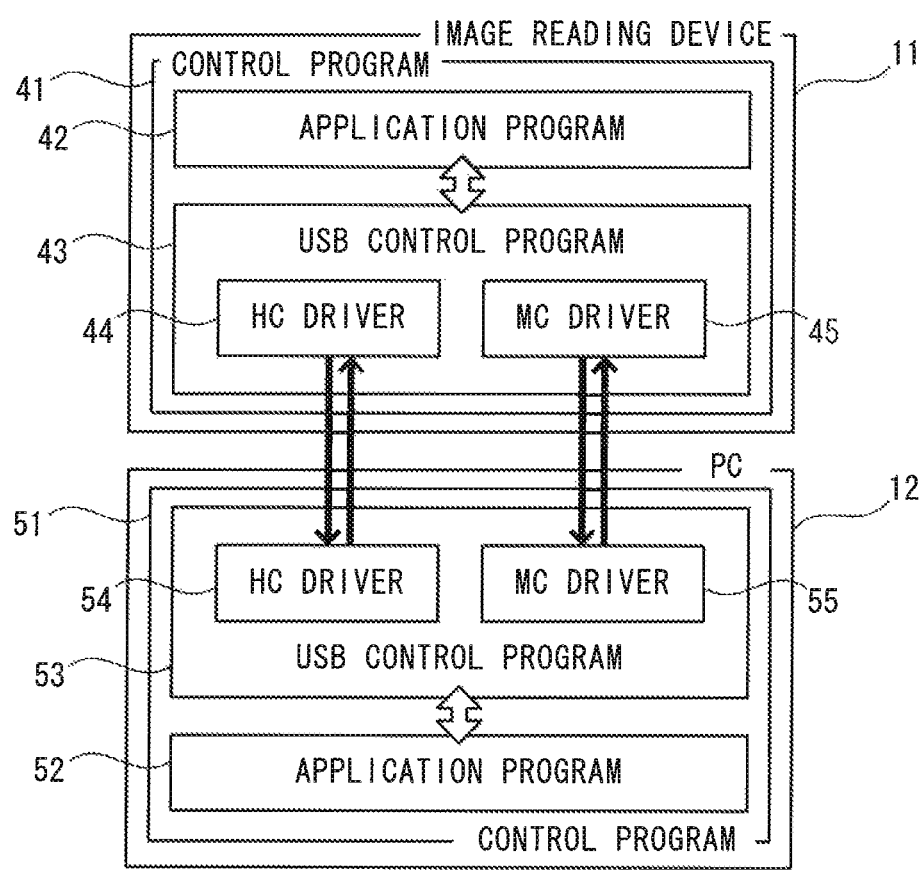
FIG. 3 is a schematic figure that shows structures of control programs that are installed in the image reading device and the personal computer.

A structure of a control program 41 that is stored in the flash ROM 23 of the image reading device 11 will be explained with reference to FIG. 3. The control program 41 includes an application program 42 and a USB control program 43. The application program 42 performs high-level processing within the control program 41. The high-level processing may include, for example, file operations (writing, reading), commands to the USB control program 43, and the like. The USB control program 43 includes a human interface device (HID) class driver (hereinafter referred to as the HC driver) 44 and a mass storage class driver (hereinafter referred to as the MC driver) 45. Hereinafter, the HC driver 44 and the MC driver 45 are also referred to as the installed class drivers.

In a case where the personal computer 12 is connected to the image reading device 11 by the USB cable, the HC driver 44 can cause the personal computer 12 to recognize the image reading device 11 as a human interface device. A human interface device may also be a keyboard, a mouse, or the like, for example. In a case where the personal computer 12 is connected to the image reading device 11 by the USB cable, the MC driver 45 can cause the personal computer 12 to recognize the image reading device 11 as a mass storage device. A mass storage device may also be a general-purpose storage device such as a USB memory or the like, for example. In a case where the personal computer 12 recognizes the image reading device 11 as a mass storage device, the personal computer 12 is able to read information directly from a designated storage area within the flash ROM 23 of the image reading device 11. Furthermore, in a case where the personal computer 12 recognizes the image reading device 11 as a mass storage device, the personal computer 12 is able to write information directly to the designated storage areas within the flash ROM 23 of the image reading device 11.

A structure of a control program 51 that is installed in the personal computer 12 will be explained. The control program 51 includes an application program 52 and a USB control program 53. The USB control program 53 includes an HC driver 54 and an MC driver 55. The HC driver 54 may be used for accessing the HC driver 44 of the image reading device 11. The personal computer 12 recognizes the image reading device 11 as the human interface device through the HC drivers 44, 54. The MC driver 55 may be used for accessing the MC driver 45 of the image reading device 11. The personal computer 12 recognizes the image reading device 11 as the mass storage device through the MC drivers 45, 55.

There is a strong possibility that the HC driver 54 and the MC driver 55 are installed in the personal computer 12 as standard components of the operating system that is installed in the personal computer 12. For example, an HC driver and an MC driver are installed as standard components of Windows (registered trademark), which is a general-purpose operating system. Hereinafter, the HC driver 54 and the MC driver 55 will also be referred to as the standard class drivers. The standard class drivers may be installed in the personal computer 12 in advance. By using the standard class drivers, the personal computer 12 is able to recognize the image reading device 11 as a human interface device and to recognize the image reading device 11 as a mass storage device. Therefore, the personal computer 12 can recognize the image reading device 11 simply and accurately, without requiring that the class drivers be installed by the user.

The image reading device 11 includes the installed class drivers, which are a plurality of class drivers that correspond to the standard class drivers. The installed class drivers are the class drivers that are used when communication is performed with the personal computer 12 in a state in which the personal computer 12 uses the standard class drivers. The image reading device 11 is able to use the HC driver 44 and the MC driver 45 at the same time. Therefore, the personal computer 12 is able to recognize the connected image reading device 11 as a mass storage device at the same time that the personal computer 12 recognizes the image reading device 11 as a human interface device. Hereinafter, the recognizing of the image reading device 11 as a human interface device by the personal computer 12 and the performing of communication through the HC drivers 44, 54 will also be referred to as the performing of communication through the HC interface. The recognizing of the image reading device 11 as a mass storage device by the personal computer 12 and the performing of communication through the MC drivers 45, 55 will also be referred to as the performing of communication through the MC interface. The image reading device 11 is able to communicate with the personal computer 12 through a plurality of interfaces at the same time. The image reading device 11 is thus able to establish a plurality of communication paths with the personal computer 12. The image reading device 11 is able to perform different communications through the separate communication paths. Therefore, the image reading device 11 is able to communicate with the personal computer 12 smoothly, even in a case where the volume of communication data is high and in a case where a plurality of communications are being performed at the same time.

Figure 4:
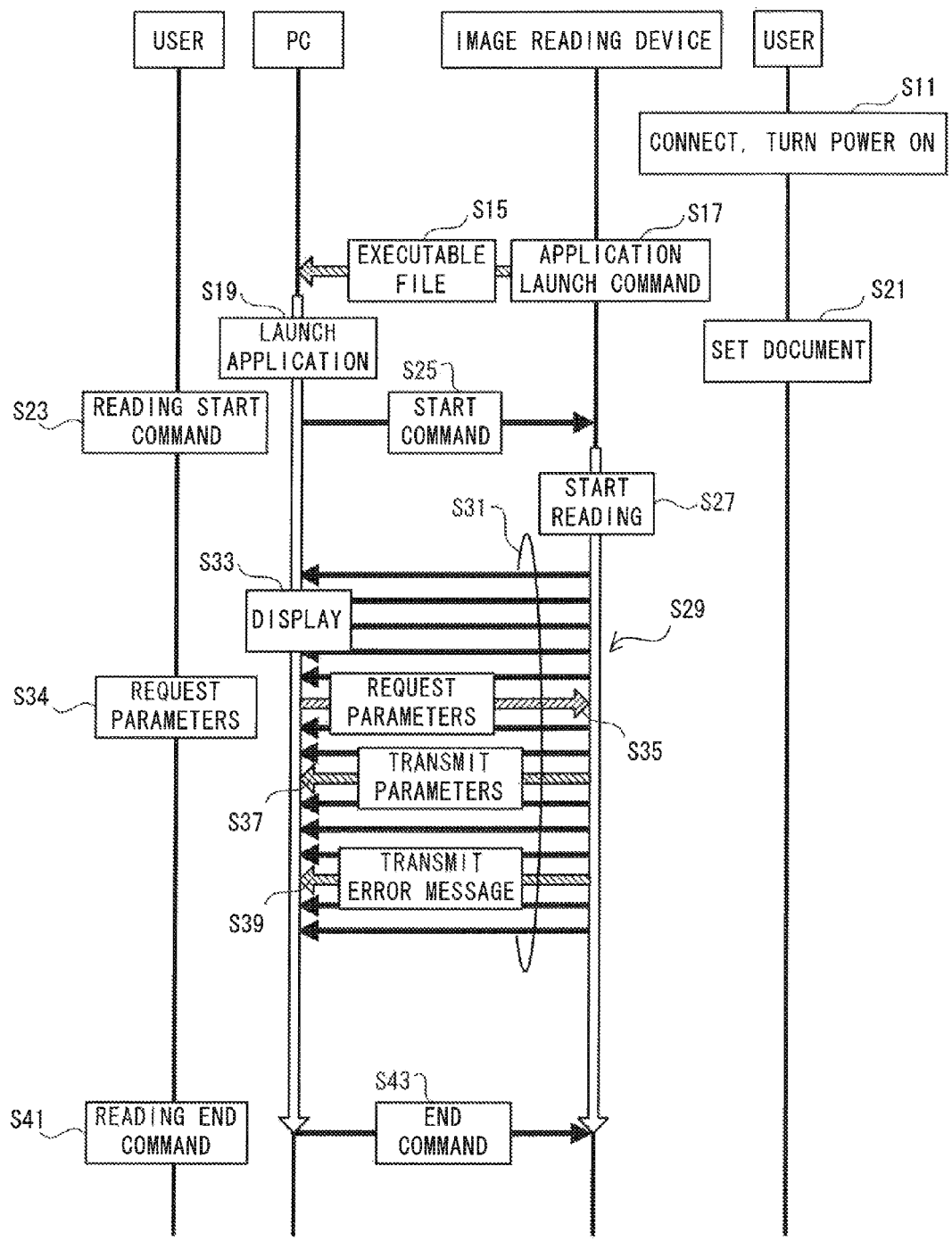
FIG. 4 is a figure that shows a communication procedure between the image reading device and the personal computer.

The procedure for the communications that are performed between the image reading device 11 and the personal computer 12 when the image reading device 11 reads an image will be explained with reference to FIG. 4. The user may use the USB cable to connect the image reading device 11 and the personal computer 12 in a state in which their power supply for the image reading device 11 is off. The user turns on the power supply to the image reading device 11 (Step S11). The personal computer 12 detects the image reading device 11. The personal computer 12 uses USB plug and play to recognize the image reading device 11 as a human interface device and a mass storage device. The image reading device 11 can communicate with the personal computer 12. In a case where the image reading device 11 communicate with the personal computer 12, the communication through the HC interface and the communication through the MC interface can be performed, simultaneously.

In the state in which the personal computer 12 has recognized the image reading device 11 as a mass storage device, the personal computer 12 is able to read information directly from a designated area within the flash ROM 23 of the image reading device 11. The executable file for the application is stored in the designated area within the flash ROM 23. The purpose of the application is to enable the personal computer 12 to issue a command to the image reading device 11. The personal computer 12 can read the application directly from the flash ROM 23 of the image reading device 11. The operation of the reading the flash ROM 23 by the personal computer 12 causes the executable file to be transmitted from the image reading device 11 to the personal computer 12 (Step S15). In a case where the personal computer 12 reads the application from the flash ROM 23, the image reading device 11 may transmit the executable file. The personal computer 12 receives the executable file.

The personal computer 12 stores the executable file that has been received from the image reading device 11 in the RAM 33. Through the MC interface, the image reading device 11 issues a command to the personal computer 12 to execute the executable file that was transmitted at Step S15 (Step S17). The personal computer 12 executes the executable file that is stored in the RAM 33 and launches the application (Step S19). A screen on which it is possible to perform an input operation for controlling the image reading device 11 is displayed on the display 35 of the personal computer 12. The user is able to control the image reading device 11 by performing an input operation through the keyboard 36 or the mouse 37 in accordance with the displayed screen.

The user of the personal computer 12 sets a document on the platen of the image reading device 11 (Step S21). In accordance with the screen that is displayed on the display 35, the user of the personal computer 12 inputs a command to start the reading of the image (Step S23). Through the HC interface, the personal computer 12 issues a command to the image reading device 11 to start the reading of the image (Step S25). In response to the command from the personal computer 12, the image reading device 11 starts to read the image from the document that has been set on the platen (Step S27).

The image reading device 11 reads sequentially the image of the document that has been set on the platen, one line at a time, in a main scanning direction (Step S29). The image of the one line that has been read is temporarily stored in the SRAM 22. Every time that the image reading device 11 reads one line's worth of the image, the image reading device 11 reads out the image of the one line that is stored in the SRAM 22. Through the HC interface, the image reading device 11 transmits the image that has read out to the personal computer 12, one line at a time (Step S31). The transmitted image of the one line is deleted from the SRAM 22. It is not necessary for the image reading device 11 to store in the SRAM 22 all of the one-line images that the image reading device 11 reads from the document. The image reading device 11 is therefore able to ensure a capacity in the SRAM 22 that is required in order to store the image that has been read. The personal computer 12 receives the images that the image reading device 11 has read, one line at a time, through the HC interface (Step S31). The personal computer 12 displays the received images in order on the display 35 (Step S33).

While the image is being transmitted from the image reading device 11 to the personal computer 12 (Step S31), the user can perform an input operation on the personal computer 12. For example, in a case where the user has performed an input operation to refer the parameters and the reading conditions that have been set for the image reading device 11 (Step S34), the personal computer 12 makes a request to the image reading device 11 through the MC interface for the parameters that have been set for the image reading device 11 (Step S35). The transmitting of the image that the image reading device 11 has read is performed through the HC interface, and the MC interface is not being used for the transmitting of the image. Communication that is performed through the MC interface does not affect communication that is performed through the HC interface. Therefore, the communication to request the parameters does not affect the transmission of the image that has been read.

In response to the command from the personal computer 12, the image reading device 11 reads the parameters that have been set from the EEPROM 24. The image reading device 11 transmits the parameters that have been read to the personal computer 12 through the MC interface (Step S37). The MC interface is used for the transmitting of the parameters in the same manner as it was in the communication at Step S35. Therefore, the communication for transmitting the parameters does not affect the communication that is performed through the HC interface. The transmitting of the parameters therefore does not affect the transmitting of the image that has been read.

While the image is being transmitted from the image reading device 11 to the personal computer 12 (Step S31), an error of some sort may occur in the image reading device 11. The error that occurs may be a failure in the reading of the image, or a failure in the writing of information to the flash ROM 23, for example. In a case where the image reading device 11 detects an error, the image reading device 11 notifies the personal computer 12 through the MC interface that the error has been detected (Step S39). The MC interface is used for the providing of notification about the error in the same manner as it was in the communications at Steps S35 and S37. Therefore, the communication for providing the notification about the error does not affect the communication that is performed through the HC interface. In other words, the communication for providing the notification about the error does not affect the transmitting of the image that has been read.

As explained above, through the HC interface, the image reading device 11 can smoothly perform the transmitting of the image that has been read. Through the MC interface, the image reading device 11 can reliably perform the communications for the requesting and transmitting of the parameters, the notification of the occurrence of errors, and the like.

In a case where the image reading device 11 has completed the reading operation and the images of the document have all been read, the reading of the images by the image reading device 11 is discontinued. The user is able to recognize the entire image that has been read by visually checking the display 35 of the personal computer 12. In a case where the user, in accordance with the displayed screen, has input a command to end the reading of the images (Step S41), the personal computer 12 issues a command to the image reading device 11 through the HC interface to end the reading of the images (Step S43). In response to the command from the personal computer 12, the image reading device 11 ends the reading of the images from the document.

The image reading device 11 transmits the images that the image reading device 1 has read to the personal computer 12 one line at a time, even as the image reading device 11 continues reading the images (Step S31). Therefore, at the point when the reading of the images of the document ends, the number of the images that are remaining to be transmitted from the image reading device 11 to the personal computer 12 is low. Therefore, the personal computer 12 can display an image of the entire document which described by all of the one-line images that have been read by the image reading device 11 on the display 35 in a shorter time, comparing to a case in which an image of the entire document is transmitted to the personal computer 12 after the reading of the image has ended. Therefore, in a shorter time, the user is able to recognize the image that the image reading device 11 has read.

Various types of processing that are performed by the CPU 21 of the image reading device 11 and the CPU 31 of the personal computer 12 will be explained with reference to FIGS. 5 to 11. The CPU 31 of the personal computer 12 launches and performs main processing (PC) (refer to FIGS. 5, 6), application execution processing (PC) (refer to FIG. 8), and error monitoring processing (PC) (refer to FIG. 10). The main processing (PC) is launched when the power supply for the personal computer 12 is turned on. The application execution processing (PC) (refer to FIG. 8) and the error monitoring processing (PC) are launched in the course of the main processing (PC). The individual types of processing are performed in parallel. The CPU 21 of the image reading device 11 launches and performs main processing (reading device) (refer to FIG. 7), application execution processing (reading device) (refer to FIG. 9), and error monitoring processing (reading device) (refer to FIG. 11). The main processing (reading device) is launched when the power supply for the image reading device 11 is turned on. The application execution processing (reading device) and the error monitoring processing (reading device) are launched and performed in the course of the main processing (reading device). The individual types of processing are performed in parallel.

Figure 5:
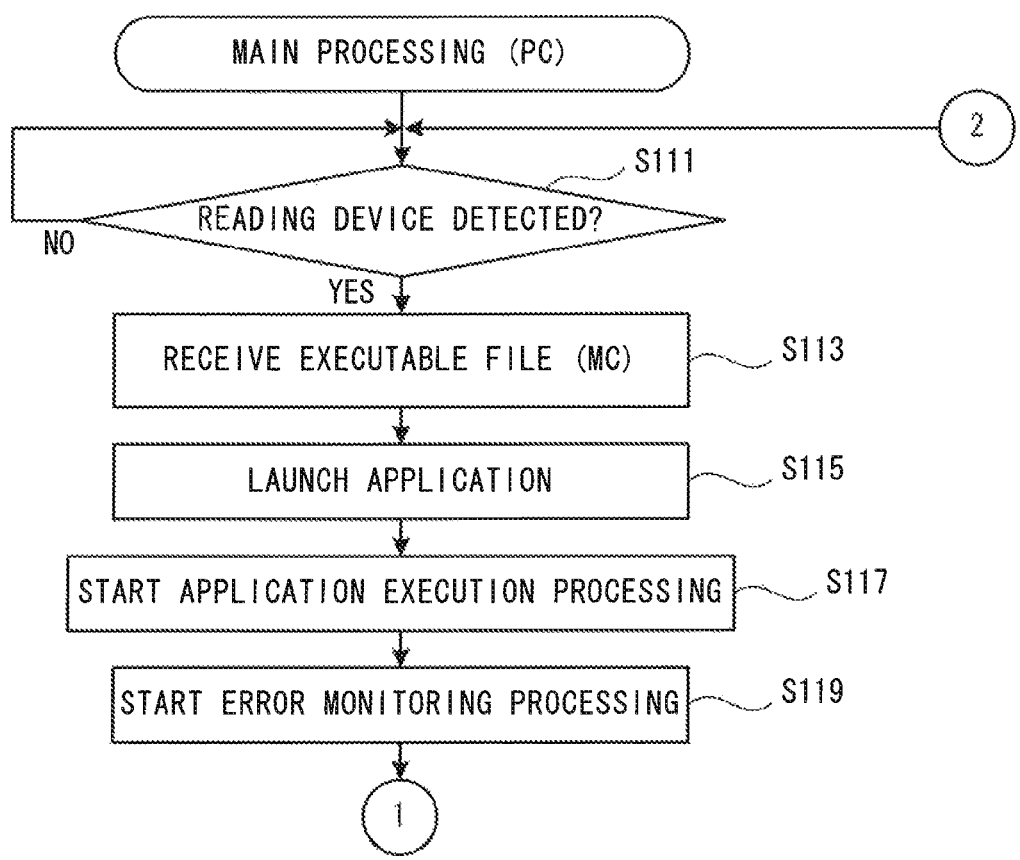
FIG. 5 is a flowchart that shows main processing (PC)

The main processing (PC) will be explained with reference to FIGS. 5 and 6. The personal computer 12 and the image reading device 11 are connected through the USB cable. The personal computer 12 determines whether the image reading device 11 has been detected (Step S111). At Step S111, the personal computer 12 determines whether the image reading device 11 has been detected based on whether the power supply for the image reading device 11 has been turned on. In a case where the power supply for the image reading device 11 has not been turned on, the image reading device 11 is not detected (NO at Step S111). The processing returns to Step S111.

In a case where the power supply for the image reading device 11 has been turned on and the image reading device 11 has been detected (YES at Step S111), the image reading device 11 is recognized as a human interface device and as a mass storage device. The personal computer 12 is able to communicate with the image reading device 11. In a case where the personal computer 12 communicate with the image reading device 11, the communication through the HC interface and the communication through the MC interface can be performed, simultaneously.

Figure 7:
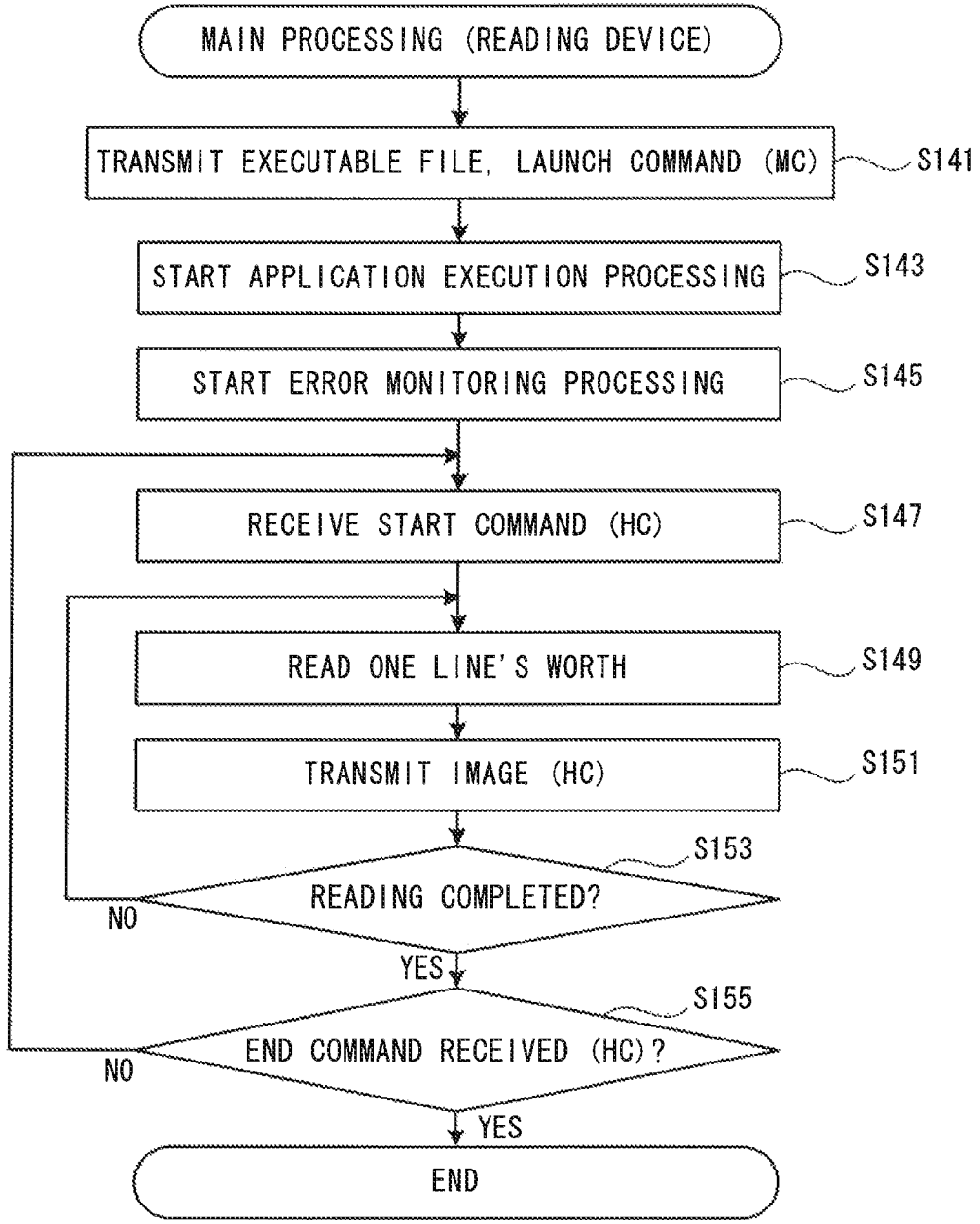
FIG. 7 is a flowchart that shows main processing (reading device)

The image reading device 11 transmits the executable file for the application to the personal computer 12 (refer to FIG. 7, Step S141). For example, in a case where the application stored in the flash ROM 23 is read by the personal computer 12, the image reading device 11 transmits the executable file to the personal computer 12. The personal computer 12 receives, through the MC interface, the executable file that has been transmitted from the image reading device 11 (Step S113). The received executable file is stored in the RAM 33. The image reading device 11 also transmits to the personal computer 12 a command to execute the executable file (refer to FIG. 7, Step S141). The personal computer 12 receives, through the MC interface, the command to execute the executable file that is stored in the RAM 33. The personal computer 12 launches the application based on the executable file that is stored in the RAM 33 (Step S115). A screen for accepting an input operation by the user is displayed on the display 35. While the application is running, processing that accepts the input operation from the user (the application execution processing (PC) (refer to FIG. 8)) is started (Step S117). The application execution processing (PC) will be described in detail later. While the application is being launched, processing that accepts the error notification from the image reading device 11 (the error monitoring processing (PC) (refer to FIG. 10)) is started (Step S119). The error monitoring processing (PC) will be described in detail later.

The user can perform an input operation in accordance with the screen that is displayed on the display 35. As shown in FIG. 6, the personal computer 12 determines whether an input operation for causing the image reading device 11 to start reading an image has been accepted (Step S121). In a case where the personal computer 12 has not accepted an input operation for starting the reading of an image (NO at Step S121), the processing returns to Step S121. In a case where an input operation for starting the reading of an image has been performed (YES at Step S121), a command to read an image is transmitted to the image reading device 11 through the HC interface (Step S123). The image reading device 11 starts reading an image (refer to FIG. 7, Step S149 onward).

An image of one line that the image reading device 11 has read is transmitted from the image reading device 11 to the personal computer 12 (refer to FIG. 7, Step S151). The personal computer 12 receives the one-line image through the HC interface (Step S125). The received one-line image is temporarily stored in the RAM 33. The individual one-line images that are received are displayed in order on the display 35 (Step S127).

It is determined whether the image reading device 11 has completed the reading operation and all of the images for the document have been read (Step S129). In a case where the one-line images are continuing to be transmitted from the image reading device 11, the reading of the image has not been completed (NO at Step S129). The processing returns to Step S125. The one-line images that are transmitted from the image reading device 11 continue to be received through the HC interface (Step S125). In contrast, in a case where the transmission of the images from the image reading device 11 has been completed, a determination is made that the operation of the reading of the image by the image reading device 11 has been completed (YES at Step S129). In that case, the plurality of the one-line images that are temporarily stored in the RAM 33 are edited into a single image. The edited image is stored in the HDD 34 (Step S131).

In a case where the user has replaced the document that is set on the platen and wants an image of the new document to be read, the user can input a read command to the personal computer 12 in order to restart the image reading. In a case where the personal computer 12 has received a read command (YES at Step S133), the processing returns to Step S123. A command to start reading an image is transmitted to the image reading device 11 through the HC interface (Step S123), and the processing that is described above is repeated. In contrast, in a case where a command to end the reading has been input (NO at Step S133), a command to end the reading of the image is transmitted to the image reading device 11 through the HC interface (Step S135). The processing returns to Step S111 (refer to FIG. 5).

The main processing (reading device) will be explained with reference to FIG. 7. The personal computer 12 recognizes the image reading device 11 when the power supply for the image reading device 11 is turned on. At this time, the personal computer 12 recognizes the image reading device 11 as a human interface device and as a mass storage device. In a case where the image reading device 11 communicate with the personal computer 12, both the HC interface and the MC interface can be used at the same time.

The image reading device 11 transmits the executable file for the application to the personal computer 12 through the MC interface (Step S141). The image reading device 11 transmits the executable file to the personal computer 12 using the MC driver 45 of the installed class drivers. The image reading device 11 transmits a command to execute the executable file and launch the application to the personal computer 12 through the MC interface (Step S141). The personal computer 12 launches the application (refer to FIG. 5, Step S115). In response to a request from the personal computer 12, the application execution processing (reading device) (refer to FIG. 9), which is processing that transmits the parameters and the reading conditions, is started (Step S143). The application execution processing (reading device) will be described in detail later. The error monitoring processing (reading device) (refer to FIG. 11), which is processing in which the image reading device 11 detects an error and notifies the personal computer 12, is started (Step S145). The error monitoring processing (reading device) will be described in detail later.

Figure 6:
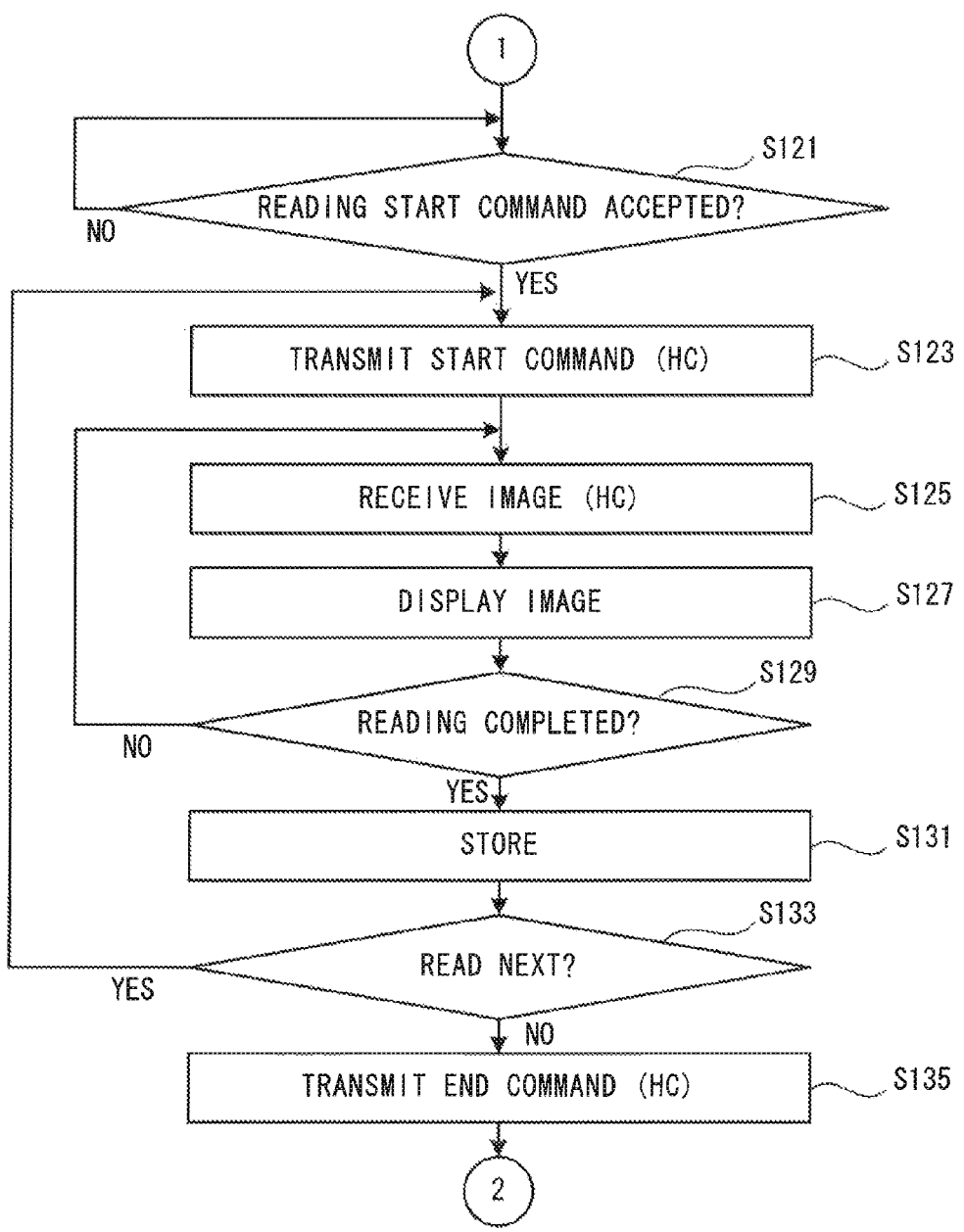
FIG. 6 is a flowchart that shows the main processing (PC), continuing from FIG. 5.

The command to read an image is transmitted from the personal computer 12 to the image reading device 11 through the HC interface (refer to FIG. 6, Step S123). The image reading device 11 receives, through the HC interface, the command that was transmitted from the personal computer 12 (Step S147). That is, the image reading device 11 receives the command to read an image from the personal computer 12 by using the HC driver 44 of the installed class drivers. The operation to read an image from the document that has been set on the platen is started. The image reading device 11 reads the image one line at a time in the main scanning direction (Step S149). The image of the one line that has been read is temporarily stored in the SRAM 22. The image reading device 11 transmits the image that is stored in the SRAM 22 to the personal computer 12 through the HC interface, one line at a time (Step S151). At this time, the image reading device 11 transmits the image that has read to the personal computer 12 using the HC driver 44. It is determined whether all of the images of the document have been read and the reading operation has been completed (Step S153). In a case where a part of the document has not been read and the operation of reading the images has not been completed (NO at Step S153), the processing returns to Step S149. The image of the next line is read (Step S149), and the processing is repeated.

In a case where all of the images of the document have been read and the reading operation has been completed (YES at Step S153), it is determined whether a command to end the reading of the image has been received through the HC interface (Step S155). In a case where the image reading device 11 has not received a command to end the reading of the image (NO at Step S155), the processing returns to Step S147. The image reading device 11 receives the command to start reading an image through the HC interface (Step S147), and starts the reading of the image (Step S149). In contrast, in a case where the command to end the reading of the image has been transmitted from the personal computer 12 to the image reading device 11 (refer to FIG. 6, Step S135), the image reading device 11 receives the command to end the reading through the HC interface (YES at Step S155). The main processing (reading device) is terminated.

The application execution processing (PC) will be explained with reference to FIG. 8. It is determined whether an operation for referring the parameters and the reading conditions has been input (Step S171). In a case where an operation for referring the parameters and the reading conditions has not been input (NO at Step S171), the processing returns to Step S171. The personal computer 12 continues to monitor the input operations.

In a case where an operation for referring the parameters and the reading conditions has been input (YES at Step S171), a request for the parameters and the reading conditions is transmitted to the image reading device 11 through the MC interface (Step S173). The transmission of the image that has been read in the image reading device 11 is performed through the HC interface (refer to FIG. 7, Step S151). Therefore, even in a case where the request is transmitted through the MC interface, there is no effect on the communication through the HC interface.

Figure 9:
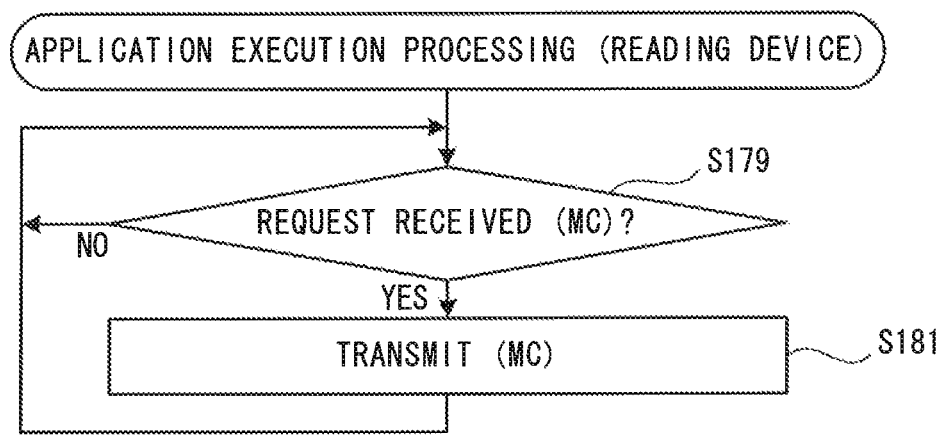
FIG. 9 is a flowchart that shows application execution processing (reading device)

In response to the request, the image reading device 11 transmits to the personal computer 12, through the MC interface, the parameters and the reading conditions that have been set (refer to FIG. 9, Step S181). The parameters and the reading conditions are received through the MC interface (Step S175). The received parameters and the reading conditions are displayed on the display 35 (Step S177). The processing returns to Step S171.

The application execution processing (reading device) will be explained with reference to FIG. 9. The image reading device 11 determines whether the request for the parameters and the reading conditions has been received through the MC interface (Step S179). In a case where the request for the parameters and the reading conditions has not been received (NO at Step S179), the processing returns to Step S179.

Figure 8:
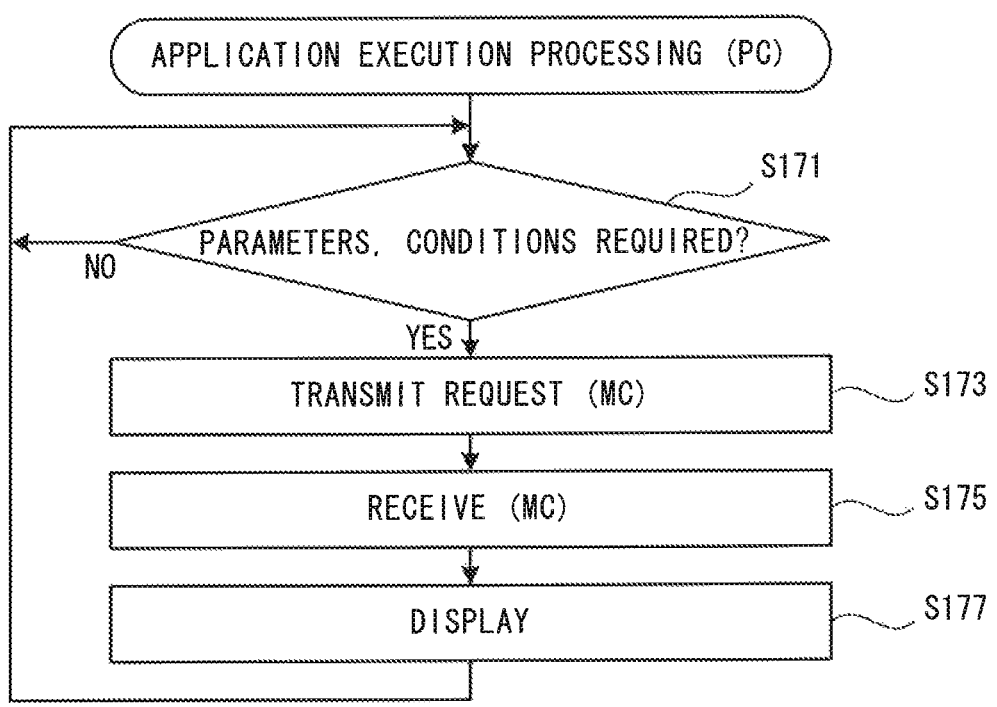
FIG. 8 is a flowchart that shows application execution processing (PC)

In a case where the personal computer 12 accepts an input operation to refer the parameters and the reading conditions that have been set in the image reading device 11, the personal computer 12 transmits to the image reading device 11, through the MC interface, a command that requests the parameters and the reading conditions (refer to FIG. 8, Step S173). The image reading device 11 receives the transmitted request through the MC interface (YES at Step S179). The parameters and the reading conditions that have been set are read from the EEPROM 24. The image reading device 11 transmits the parameters and the reading conditions that have been read to the personal computer 12 through the MC interface (Step S181). In the same manner as the transmission at Step S173 (refer to FIG. 8), the transmission of the parameters and the reading conditions is performed through the MC interface. Therefore, the transmission of the parameters and the reading conditions does not have any effect on the image transmission that is being performed through the HC interface. The processing returns to Step S179.

As described above, the image reading device 11 is able to use the HC interface and the MC interface at the same time. Accordingly, it is possible to prevent the communication through one of the interfaces from affecting the communication through the other interface. Therefore, the image reading device 11 is able to perform both the transmitting of the image through the HC interface and the transmitting of the parameters and the reading conditions through the MC interface rapidly and reliably.

Figure 10:
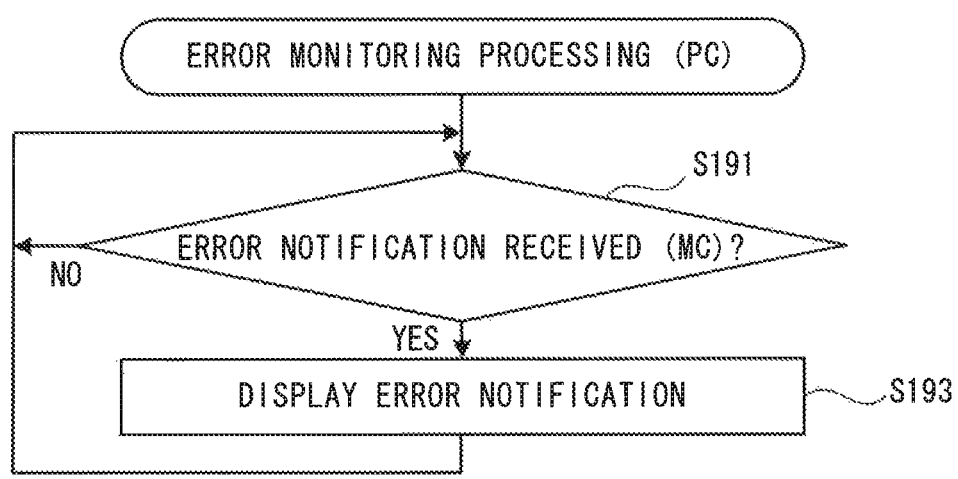
FIG. 10 is a flowchart that shows error monitoring processing (PC)

The error monitoring processing (PC) will be explained with reference to FIG. 10. The personal computer 12 determines whether a notification that an error was detected has been received from the image reading device 11 through the MC interface (Step S191). In a case where the personal computer 12 has not received the notification that indicates an error was detected (NO at Step S191), the processing returns to Step S191. In a case where the notification that an error was detected has been received (YES at Step S191), the notification that the error was detected is displayed on the display 35 (Step S193). The processing returns to Step S191.

Figure 11:
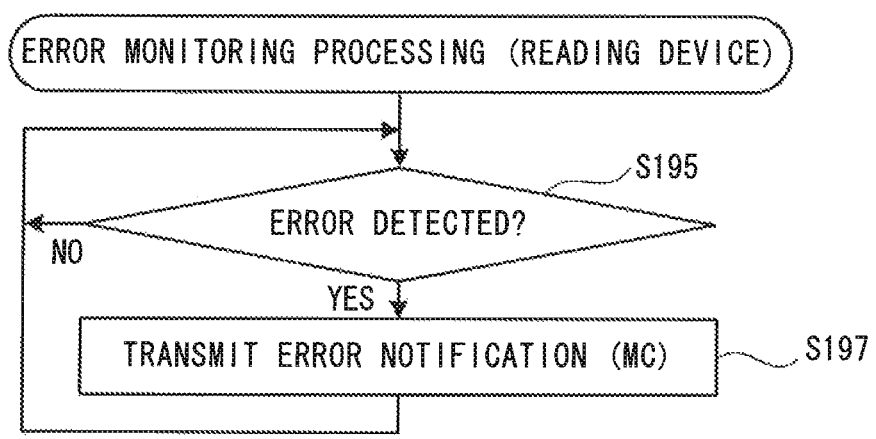
FIG. 11 is a flowchart that shows error monitoring processing (reading device).

The error monitoring processing (reading device) will be explained with reference to FIG. 11. The image reading device 11 determines whether an error has been detected (Step S195). In a case where the image reading device 11 has detected an error (NO at Step S195), the processing returns to Step S195. In a case where the image reading device 11 has detected an error (YES at Step S195), the image reading device 11 transmits the notification that the error was detected to the personal computer 12 through the MC interface (Step S197). The errors that can be detected include a failure in the reading of the image and a failure in writing to the flash ROM 23, for example. Note that the transmission of the image that has been read by the image reading device 11 is performed through the HC interface (refer to FIG. 7, Step S151). Therefore, even in a case where the error notification is transmitted through the MC interface, there is no effect on the communications through the HC interface. The processing returns to Step S195.

As explained previously, the image reading device 11 includes the installed class drivers (the HC driver 44 and the MC driver 45). The installed class drivers are drivers that correspond to the standard class drivers (the HC driver 54 and the MC driver 55) that are installed in the personal computer 12. The installed class drivers are the class drivers that are used when communications are performed with the personal computer 12 when the personal computer 12 is in a state in which the standard class drivers are being used. The image reading device 11 is able to communicate with the personal computer 12 reliably by using a plurality of class drivers simultaneously. Therefore, the image reading device 11 is able to communicate with the personal computer 12 smoothly, even in a case where the volume of data in communications with the personal computer 12 is high and in a case where a plurality of communications are being performed at the same time. The image reading device 11 is able to smoothly transmit the image that the image reading device 11 has read to the personal computer 12.

The personal computer 12 is able to recognize the image reading device 11 as a mass storage device. Accordingly, the personal computer 12 can read the application directly from the image reading device 11. The image reading device 11 can easily provide the application to an external device. The personal computer 12 is also able to recognize the image reading device 11 as a human interface device. Accordingly, the personal computer 12 can communicate with the image reading device 11 easily.

There is a strong possibility that class drivers correspond to the HC driver 44 and the MC driver 45 that are provided in the image reading device 11 are installed as standard software in the personal computer 12. That is because these class drivers are incorporated as standard components of the operating system in many cases. Therefore, even without performing an installation of the drivers in the personal computer 12, the user can cause the personal computer 12 to recognize the image reading device 11 properly.

The present disclosure is not limited to the embodiment that is described above, and various types of modifications can be made. In the embodiment that is described above, in a case where an error is detected by the image reading device 11, the error notification is transmitted through the MC interface. The error notification may also be transmitted through the HC interface. The image reading device 11 may transmit to the personal computer 12, through the HC interface, the same sort of signal that is transmitted in a case where a specified character string has been entered through a keyboard. The specified character string may be "XX error has occurred" or the like, for example. The personal computer 12 may take the character string that has received from the image reading device 11 and display the character string on the display 35 through an application such as a text editor or the like. Accordingly, the image reading device 11 can provide a detailed notification of the detected error. By displaying the received character string on the display 35, the personal computer 12 is also able to provide the user with a detailed notification of the error that occurred in the image reading device 11.

In the embodiment that is described above, the executable file for the application that is transmitted from the image reading device 11 through the MC interface is stored in the RAM 33 of the personal computer 12. The application is launched by executing the stored executable file.

In the embodiment that is described above, communications between the image reading device 11 and the personal computer 12 can be performed with using the HC interface and the MC interface at the same time. The image reading device 11 may also be provided with drivers other than the HC driver 44 and the MC driver 45, for example. The image reading device 11 may also be provided with other class drivers, as long as the other class drivers are class drivers that correspond to the standard class drivers that are installed in the personal computer 12. For example, the image reading device 11 may also be provided with a printer class driver and a scanner class driver. The number of the class drivers that are installed in the image reading device 11 may also be greater than two.

The interface that is used in a case where the executable file for the application is transmitted from the image reading device 11 to the personal computer 12 is not limited to being the MC interface. The executable file may also be transmitted from the image reading device 11 to the personal computer 12 by communication that is performed using a different class driver. The interface that is used in a case where the image that has been read by the image reading device 11 is transmitted to the personal computer 12 is not limited to being the HC interface. The image may also be transmitted from the image reading device 11 to the personal computer 12 by communication that is performed using a different class driver. The interface that is used in the cases where the start command (Step S123) and the end command (Step S135) are transmitted from the personal computer 12 to the image reading device 11 is not limited to being the HC interface, and a different interface may also be used. The MC interface may also be used, for example.

In the embodiment that is described above, the image reading device 11 reads the image one line at a time and transmits the image to the personal computer 12. However, the image may also be read n lines at a time (where n is an integer). The image reading device 11 may also transmit the image that has been read n lines at a time to the personal computer 12. The value of n may be set by settings. It is also acceptable for the image reading device 11 not to transmit the image n lines at a time. The image reading device 11 may also transmit the image that has read to the personal computer 12 after the image reading device 11 has read the entire image.

The application that the personal computer 12 executes in order to control the image reading device 11 may also be stored in the personal computer 12 in advance. For example, the personal computer 12 may also acquire from the image reading device 11, through the MC interface, only the parameters that are necessary in order for the personal computer 12 to control the image reading device 11.

When the image reading device 11 in the embodiment that is described above transmits the executable file to the personal computer 12, the image reading device 11 also transmits the command to execute the executable file (Step S141). However, the image reading device 11 may also not transmit the command to execute the executable file. In that case, it is sufficient for the image reading device 11 to transmit only the executable file to the personal computer 12. In that case, after the personal computer 12 has received the executable file, the executable file may be executed in accordance with an input operation from the user, for example.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. An image reading device configured to be connected to an external device in which standard class drivers have been installed and configured to read an image based on a command from the external device, the standard class drivers being a plurality of class drivers, the image reading device comprising:
    a reading portion that reads an image; and
    a communication portion that performs communications with the external device by using a first class driver and a second class driver simultaneously, the first class driver being a class driver that is installed in the image reading device and that corresponds to one of the standard class drivers, the second class driver being a class driver that is installed in the image reading device and that corresponds to one of the standard class drivers, and the second class driver being a different class driver from the first class driver, the communication portion including:
        a first transmission portion that transmits to the external device, using the first class driver, data that are used for executing an application that enables the external device to issue a command to the image reading device;
        a receiving portion that, in a case where a command to read an image has been input to the external device after the external device has executed the application based on the data that were transmitted by the first transmission portion, receives from the external device, using the second class driver, the command to read an image; and
        a second transmission portion that, in a case where the receiving portion has received the command to read an image, transmits to the external device, using the second class driver, an image that has been read by the reading portion.

2. The image reading device according to claim 1, wherein the first class driver is a driver that causes the external device to recognize the image reading device as a storage portion.

3. The image reading device according to claim 2, wherein the first class driver is a mass storage class driver.

4. The image reading device according to claim 1, wherein the second class driver is a human interface device class driver.

5. The image reading device according to claim 1, wherein the reading portion reads an image one line at a time in a main scanning direction, and
    the second transmission portion transmits the image that the reading portion has read to the external device one line at a time.

6. The image reading device according to claim 1, further comprising:
    a detection portion that detects an error in the image reading device; and
    a third transmission portion that, in a case where the detection portion has detected an error, transmits to the external device, using one of the first class driver and the second class driver, a notification that the error was detected.

7. The image reading device according to claim 1, wherein the data that are used for executing the application are in the form of an executable file for the application.

* * * * *